Sept. 26, 1933.    T. E. COLEMAN    1,928,047
FLOW RESTRICTOR

Original Filed Oct. 26, 1929

Inventor
Thomas E. Coleman

By Dodge and Sons
Attorneys

Patented Sept. 26, 1933

1,928,047

UNITED STATES PATENT OFFICE 1,928,047

FLOW RESTRICTOR

Thomas E. Coleman, Madison, Wis., assignor to Madison-Kipp Corporation, Madison, Wis., a corporation of Wisconsin Original application October 26, 1929, Serial No. 402,721. Divided and this application April 2, 1931. Serial No. 527,238

2 Claims. (Cl. 137—75)

The present invention relates to flow restrictors for fluid conduits. More particularly, the invention pertains to a removable plug adapted to be interposed between a force pump, or the like, and a gas engine cylinder, the plug having one or more annular grooves therearound, and a housing accommodating the plug.

In the preferred form of the invention the plug is provided with two grooves of different depth or capacity, either of which may be aligned with oppositely disposed orifices in a duct whereby a definite regulation of the flow of fluid through the duct is obtained.

In my copending application, Serial No. 402,721, filed October 26, 1929, there is illustrated a device for regulating the amount of lubricating oil delivered to the walls of an internal combustion engine according to the speed of the engine. There is also shown and described in said copending application a flow restrictor for the purpose of reducing pressure in the oil line. The present application is a division of said application Serial No. 402,721.

In some types of internal combustion engines it is highly desirable accurately to regulate the amount of oil delivered to the parts to be lubricated or control water supplied to the combustion space of kerosene motors. Varying engine speeds and temperature conditions, as well as other factors, necessitate adjustment of flow regulators associated with the engine. Obviously, a pipe or duct capable of delivering a quantity of fluid sufficient to meet operating requirements under certain conditions may be too large or too small when these conditions change. A large conduit is more desirable than a small one, because it can be throttled to decrease the flow. While adjustable needles or gate valves are capable of regulating flow in pipes, they may be easily displaced or tampered with, and cause serious interference with efficient operation of the lubricator. They do not, furthermore, insure constant flow.

Generally speaking, once it has been determined by tests, regulations to meet but two different conditions will suffice to insure effective supply of a fluid to an engine or the like. In the present invention, a plug having two calibrated grooves is inserted in the fluid conduit, one of the grooves being designed to restrict the fluid passage to provide for a certain rate of flow under one set of conditions, and the other groove controlling flow through the passage under the other set of conditions. Only one of the grooves is in alignment with the passage when the plug is in place, but by removing and reversing its position in its housing, the plug may be disposed in the fluid line to bring the other groove into regulating relation with the fluid duct.

In the drawing, a preferred form of restrictor is illustrated, and its function with respect to a lubricating supply line for engines is set forth in the following description thereof. It is to be understood, however, that the restrictor is susceptible of application to other types of fluid conduits.

Figure 1:
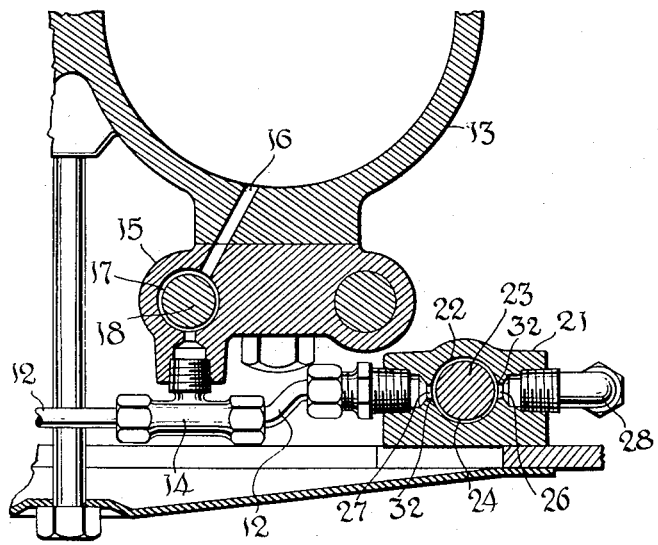
Fig. 1 is a plan view partly in section of one cylinder of a multi-cylinder internal combustion engine, showing the disposition of the restrictor in the oil supply line.

Figure 2:
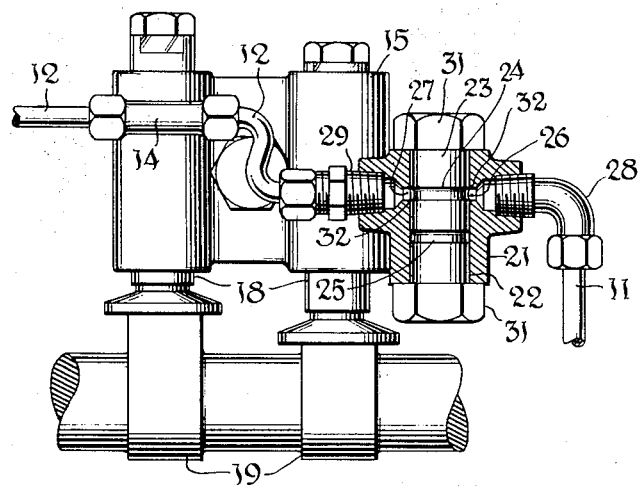
Fig. 2 is an elevation, partly in section, corresponding to Fig. 1.

Referring to the drawing, an oil supply pipe 11 is connected to any suitable source of oil under pressure, preferably a pump. Pipe 12 conducts oil therefrom to a plurality of cylinders, only one of which is shown at 13. A coupling 14 connected to pipe 12 and to a tapped bracket 15 directs the lubricant to a passage 16 in the cylinder wall, the oil first passing through a groove 17 in one of the valve tappets 18.

The valve tappets are reciprocated by cams 19, and groove 17, being relatively narrow, is alternately brought into and out of alignment with passage 16 during reciprocation of the tappets. This operation is described in the copending application hereinbefore referred to, and requires no further description.

Interposed between pipes 11 and 12 is a housing 21 having a cylindrical bore 22 therethrough adapted to accommodate a plug 23. The latter is provided with annular grooves 24, 25, so spaced from each other and from the ends of the plug that only one of the grooves registers with aligned radial passages 26, 27 in the housing. These radial passages are tapped to receive nipples 28, 29 on the ends of pipes 11 and 12, respectively. The ends of the plug are reduced and threaded to receive nuts 31 whereby it is firmly secured in the housing. Suitable packing may, of course, be used to prevent leakage around the plug.

It will be seen from the drawing that the grooves are spaced from the ends of the plug a like distance. Reversal of the plug, therefore, permits either groove to be placed in register with the radial passages 26, 27. The grooves differ in depth so that, depending on which of the grooves is in alignment with the oil passages, a predetermined amount of lubricant will be delivered to pipe 12 for distribution in the engine cylinders. Furthermore, the corners 32 formed at the junction of the radial openings 26, 27 and the bore in housing 21 are chamfered to prevent lodging of particles of solid matter in the oil passage.

It is obvious that the restricting device prevents over-lubrication by throttling the oil line at high engine speeds and can be so placed as to provide for relatively small flow in one position or a greater flow when reversed to its other position. Other plugs may be kept on hand having grooves differing from those on the plug in immediate use, thereby to provide for selective throttling over a wide range of flow conditions.

It is also obvious that the plug may be employed to regulate supply or discharge of other fluids where operating conditions demand a constant and uniform flow of the fluid.

What is claimed is:—

1. A flow restricting device for fluid pressure conduits comprising a bored member having a pair of diametrically opposite radial passages in the wall thereof, said passages forming part of said conduit; and an imperforate removable plug fitting in the bore of said member, said plug having a pair of spaced grooves therearound, said grooves being of different depths, the plug being reversible selectively to aline either of said grooves with said passages.

2. A flow restricting device for fluid pressure conduits comprising a bored member having a pair of radial passages in the walls thereof and disposed in a plane transverse to the axis of the bore of said member, said passages being spaced nearer one end of the bore than the other end thereof and forming part of said conduit; and an imperforate removable plug fitting in the bore of said member and having a length equal to that of said bore, said plug having a pair of circumferential relatively shallow grooves of different depths, each of said grooves being spaced respectively from the ends of said plug a distance equal to the spacing of said passages from one end of the bore.

THOMAS E. COLEMAN.